(12) United States Patent
Hamilton

(10) Patent No.: US 6,886,441 B2
(45) Date of Patent: May 3, 2005

(54) BLADE ASSEMBLY COVER

(75) Inventor: Ernest J. Hamilton, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 92 days.

(21) Appl. No.: 10/437,231

(22) Filed: May 14, 2003

(65) Prior Publication Data

US 2003/0188613 A1 Oct. 9, 2003

Related U.S. Application Data

(62) Division of application No. 09/984,434, filed on Oct. 30, 2001.

(51) Int. Cl.[7] .................................................. B26D 7/22
(52) U.S. Cl. ............................ 83/478; 83/544; 144/189; 172/178; 407/31
(58) Field of Search ...................... 83/101, 168, 23, 83/25, 440.2, 478, 544, 743; 144/189, 273; 172/178; 407/31; 15/22.1, 42, 144, 160

(56) References Cited

U.S. PATENT DOCUMENTS

| 1,574,633 A | 2/1926 | Myover |
| 1,744,006 A | 1/1930 | Laws |
| 1,745,476 A | 2/1930 | Cohn |
| 2,913,926 A | 11/1959 | Hammond |
| 3,256,647 A | 6/1966 | Hutton |
| 3,296,914 A | 1/1967 | Shallenberg |
| 3,443,323 A * | 5/1969 | Grantham ..................... 34/428 |
| 4,007,983 A | 2/1977 | Knieser |
| 4,407,219 A * | 10/1983 | Dellevoet ..................... 118/60 |
| 4,428,159 A | 1/1984 | Sigetich et al. |
| 4,635,513 A | 1/1987 | McGeehee |
| 5,361,453 A | 11/1994 | Gerber |
| 5,666,869 A | 9/1997 | Sakamoto et al. |
| 5,908,224 A * | 6/1999 | Santos ....................... 299/39.2 |
| 6,272,961 B1 | 8/2001 | Lee |
| 6,390,086 B1 | 5/2002 | Collins et al. |
| 6,413,150 B1 | 7/2002 | Blair |

FOREIGN PATENT DOCUMENTS

DE 242708 1/1912

* cited by examiner

Primary Examiner—Allan N. Shoap
Assistant Examiner—Phong Nguyen
(74) Attorney, Agent, or Firm—Dickstein Shapiro Morin & Oshinsky LLP

(57) ABSTRACT

A gang blade assembly which controls the trajectory of detritus from a ball grid array substrate dicing operation is described. The assembly includes a cover which partially encases a hub with a plurality of blades. A brush is mounted on the cover to disrupt an air flow created by rotation of the hub and blades. The brush extends beneath the cover and has bristles which contact the hub. The bristles also serve to clear the hub of any detritus produced during dicing. More than one brush may be mounted on the cover.

9 Claims, 6 Drawing Sheets

BLADE ASSEMBLY COVER

This is a divisional of U.S. patent application Ser. No. 09/984,434, filed Oct. 30, 2001, pending which is hereby incorporated in its entirety by reference.

FIELD OF THE INVENTION

The invention relates to protection devices used with dicing blades which cut semiconductor packages and devices from ball grid array substrates or similar configurations.

BACKGROUND

One processing step in the fabrication of semiconductor products is the dicing of a substrate upon which a plurality of semiconductor devices is fabricated. Generally, circular saws are used for this dicing process. Known configurations of circular saws used in the semiconductor industry include a plurality of circular blades ganged onto a blade assembly, which dice along a plurality of parallel lines simultaneously and at predetermined spacings.

A problem encountered with the known dicing process is that cut material, or detritus, sprays in many directions. The spray of the detritus exposes workers to safety hazards, and creates a messy work environment. To overcome these problems, covers have been installed over the ganged blade assemblies. With specific reference to FIGS. 1a–1b, there is shown a gang blade assembly 10 that includes a blade device 20 and a cover 12. The cover 12 extends around more than half of the circumference of the blade device 20 and includes a top side 13, a trailing side 14 and a leading side 15. The blade device 20 includes a hub 24 and a plurality of parallel spaced blades 22. As illustrated, the device 20 rotates in a direction A, although the device 20 may instead rotate in an opposite direction. The trailing side 14 may extend downwardly farther than the leading side 15.

In some instances an additional deflector may also be used, as shown in FIGS. 2a–2b. FIGS. 2a–2b illustrate a gang blade assembly 110 which differs from the gang blade assembly 10 in that it includes a deflector 16 extending off from the trailing side 14 of the cover 12. The deflector 16, along with the trailing side 14, alters the trajectory of the detritus from the dicing process and inhibits the detritus from being thrown in various upward directions.

Nonetheless, the gang blade assemblies 10, 110 have a disadvantage. The speed of rotation of the blade device 20 creates an air flow which lifts portions of the detritus within the cover 12 where it can contact with the blades 22. Further, the detritus often is deposited in front of the blades, and this loose debris can also contact the blades 22. Such contact may inflict damage on the blades 22, forcing premature replacement or repair of the gang blade assembly 10, 110 or of the blade device 20.

There is therefore a need for a protective assembly which mitigates collection and build up of detritus within the cover 12.

SUMMARY

The invention provides a blade assembly that includes a blade device and a cover partially encasing said blade device. The blade device includes a hub and at least one blade on the hub. In addition, a brush is mounted on the cover and extends toward the hub.

One aspect of the invention provides a blade assembly, comprising a blade device that has a hub and at least one blade on the hub, a cover partially encasing the blade device, and first and second brushes mounted on said cover and extending toward said hub.

The invention further provides a cover assembly for use with a gang blade assembly. The cover assembly includes a cover having a leading side and a top side, at least one bracket mounted on the cover, and at least one brush mounted on the at least one bracket. The at least one brush includes bristles bristles which extend under the top side toward the leading side.

The invention additionally provides a method of controlling the trajectory of detritus during a substrate dicing operation. The method includes the steps of placing a protective cover at least partially around the periphery of a blade assembly that includes a hub and at least one blade, rotating the hub and the at least one blade, dicing a ball grid array substrate with the rotating blade, the dicing producing detritus, and disrupting an air flow caused by the rotating.

These and other advantages and features of the invention will be more readily understood from the following detailed description of the invention which is provided in connection with the accompanying drawings.

BRIEF DESCRIPTION OF THE DRAWINGS

FIG. 1b is a top view of the gang blade assembly of FIG. 1a.

FIG. 2b is a top view of the gang blade assembly of FIG. 2a.

FIG. 3b is a top view of the gang blade assembly of FIG. 3a.

FIG. 5b is a top view of the gang blade assembly of FIG. 4a.

DETAILED DESCRIPTION OF PREFERRED EMBODIMENTS

Figure 1A:
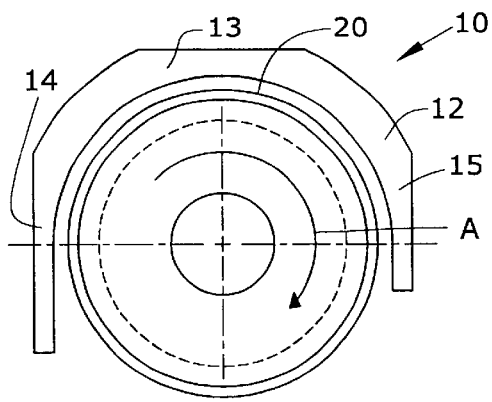
FIG. 1a is a side view of a known gang blade assembly.
Figure 2A:
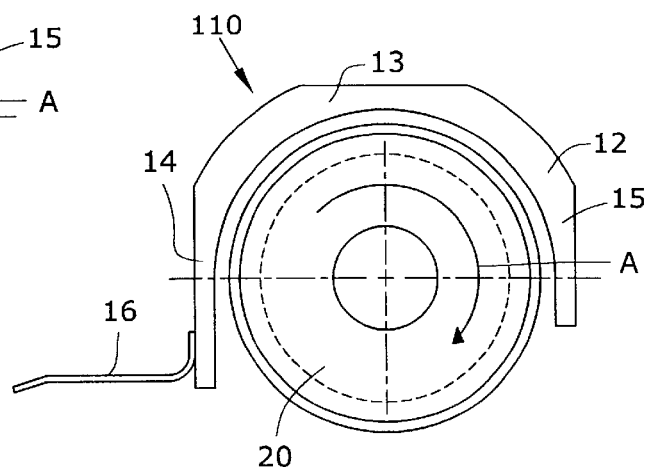
FIG. 2a is a side view of another known gang blade assembly.
Figure 1B:
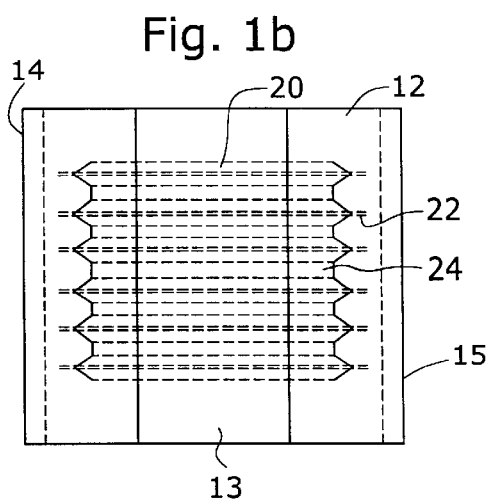
Figure 2B:
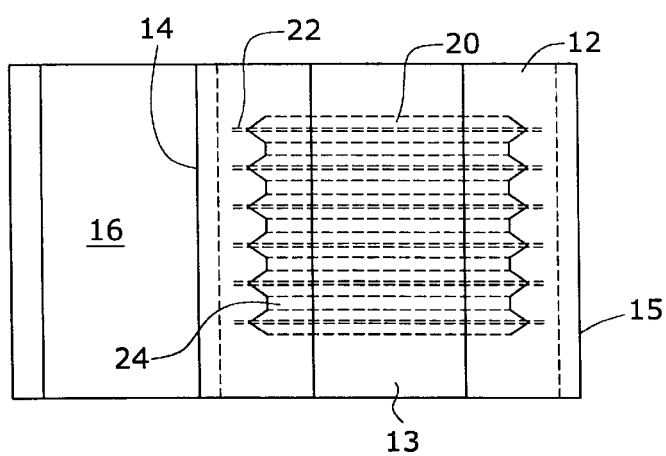
Figure 3A:
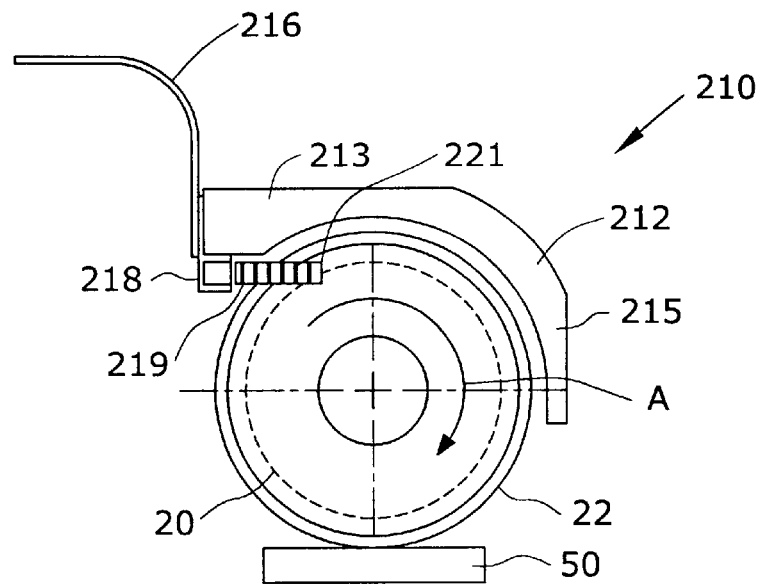
FIG. 3a is a side view of a gang blade assembly constructed in accordance with a first embodiment of the invention.
Figure 3B:
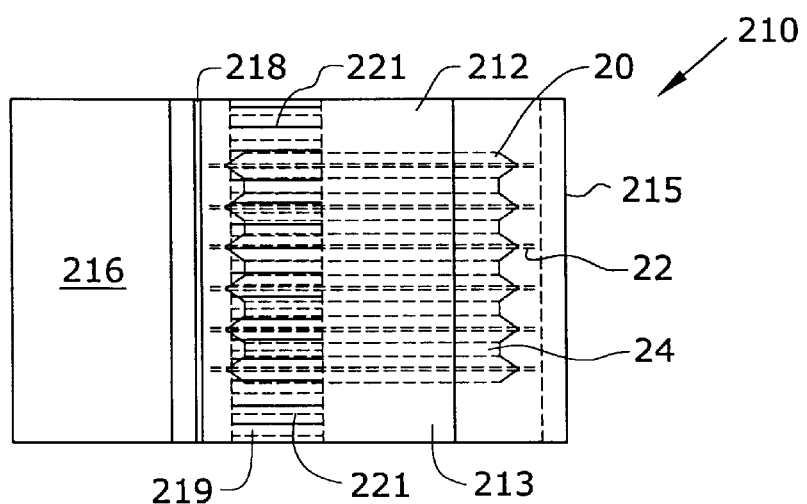
Figure 4:
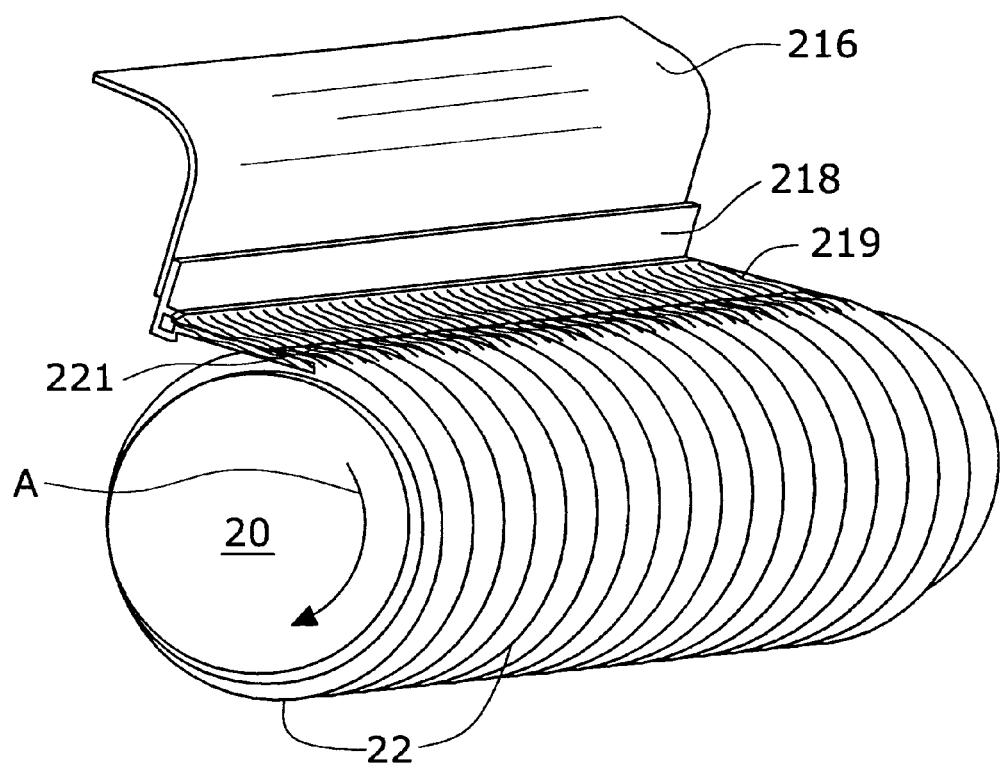
FIG. 4 is a perspective view of the gang blade assembly of FIG. 3a without the cover.

Referring now to FIGS. 3a–4, where like numerals denote like elements, a first embodiment of the invention is shown. A gang blade assembly 210 is provided which includes a blade device 20 partially encased within a cover 212. The blade device 20 includes a hub 24 and a plurality of spaced blades 22. The blade device 20 rotates within the cover 212 in the direction A. The hub 24 is generally circular in profile and the individual blades 22 extend outwardly from a surface of the hub 24 such that the blades 22 have a larger diameter than the hub 24.

The cover 212 differs from the cover 12 in that it lacks a trailing side. Instead, the cover 212 includes only a top side 213 and a flange or leading side 215. At a location at which the trailing side would be located, a bracket 218 is mounted on the cover 212. The bracket 218 serves a dual purpose. The bracket 218 holds a deflector 216 and also holds a brush 219. The brush 219 is held so as to be tangential to the hub 24, thereby allowing bristles 221 to come into contact with the hub 24. The deflector 216 extends upwardly away from the hub 24 and arches outwardly away from the bristles 221.

An environment in which the gang blade assembly 210 may be used is in the semiconductor fabrication industry as a ball grid array substrate dicing apparatus, having substrate dicing blades 22, for dicing a substrate 50 (FIG. 3a). As the hub 24 rotates in the direction A and dices the substrate 50, some detritus from the substrate 50 clings to the hub 24 while other detritus is thrown clear of the hub 24. The deflector 216 alters the trajectory of the detritus being thrown in a direction above the gang blade assembly 210. The bristles 221 contact the hub 24 and as the hub 24 rotates around in the direction A, the detritus on the hub 24 is removed by the bristles 221 of the brush 219. The bristles 221 are quickly sliced off where the brush 219 contacts the tips of each of the individual blades 22.

Another important function of the brush 219 is that it disrupts the air flow produced by the rotation of the hub 24. As noted above regarding known gang blade assemblies, such as, for example, those illustrated in FIGS. 1a–2b, an air flow is produced, by the rotation of the hub 24, which assists in lifting some of the detritus above the blades 22 and within the cover 12. The uplifted detritus builds up to the point where damage can occur to the blades 22 or the assembly must be taken out of commission to be cleaned. The bristles 221 disrupt the air flow, lessening the possibility of detritus being lifted up and suspended above the blades 22 within the cover 212 or deposited in front of the blades 22.

Figure 5A:
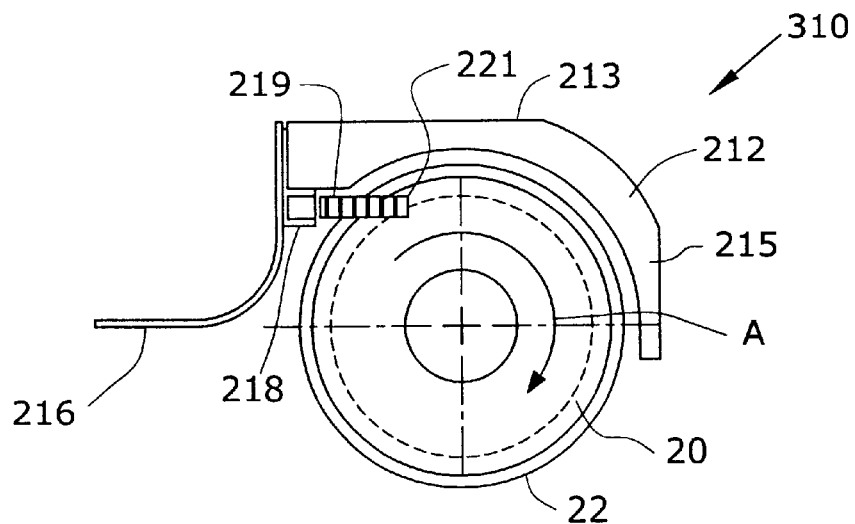
FIG. 5a is a side view of a gang blade assembly constructed in accordance with a second embodiment of the invention.
Figure 5B:
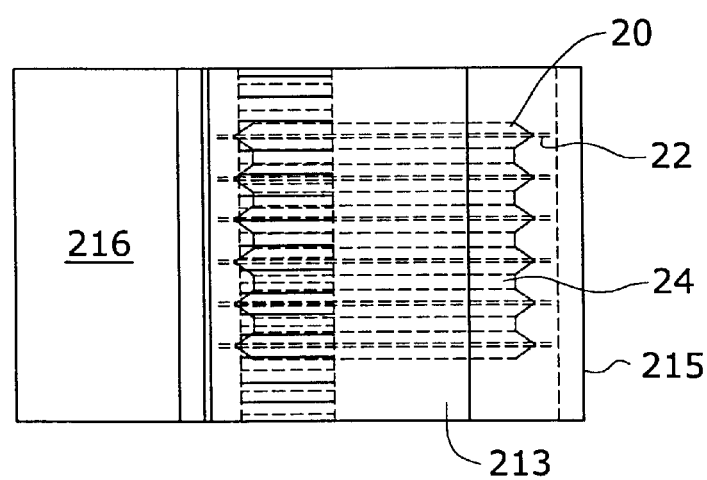

FIGS. 5a–5b illustrate a gang blade assembly 310, which differs from the gang blade assembly 212 in that the deflector 216 is mounted on the bracket 218 in a different way. Unlike the gang blade assembly 210, the deflector 216 of the gang blade assembly 310 extends downwardly from the cover 212 toward the hub 24 and arches outwardly away from the bristles 221.

Figure 6:
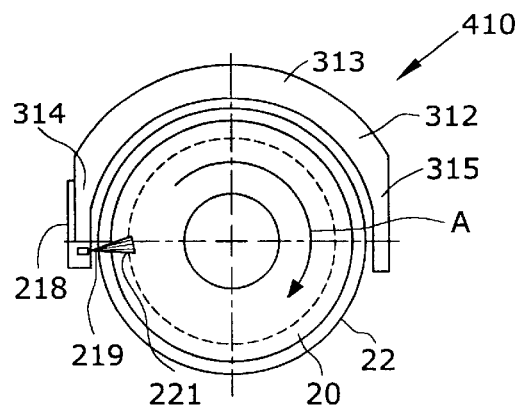
FIGS. 6–9 are side views of gang blade assemblies constructed in accordance with various additional embodiments of the invention.

FIG. 6 illustrates another embodiment of the invention, namely a gang blade assembly 410 that includes a blade device 20 within a cover 312. The cover 312 includes a top side 313, a flange or trailing side 314, and a flange or leading side 315. Whereas the top sides 13, 213 are illustrated as being somewhat flattened, the illustrated top side 313 is an arched section extending between the trailing and leading sides 314, 315. A bracket 218 is mounted on the trailing side 314. A brush 219 is mounted on the bracket 218 so that its bristles 221 contact the hub 24 of the blade device 20. The brush 219 is positioned to be perpendicular to a tangent of the trailing side 314 at a point of contact of the brush 219 and perpendicular to the hub 24 surface. The trailing side 314 assists the brush 219 in suppressing thrown detritus.

Figure 7:
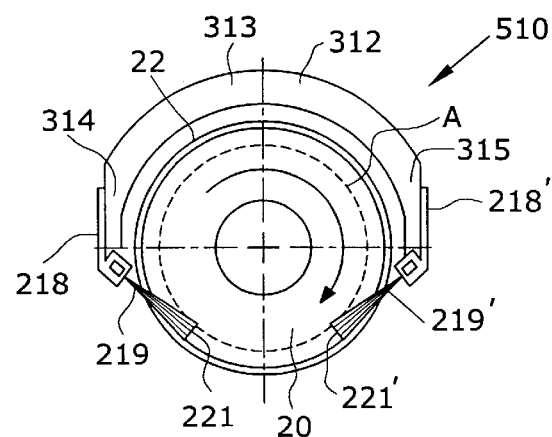

FIG. 7 shows a gang blade assembly 510 which includes the cover 312 (with the top side 313, the trailing side 314, and the leading side 315) partially encasing the blade device 20. A bracket 218 is mounted on the trailing side 314 and a second bracket 218' is mounted on a leading side 315. The bracket 218 holds a brush 219, while the bracket 218' holds a brush 219' having bristles 221'. The brushes 219, 219' extend toward the blade device 20 such that the bristles 221, 221' tangentially contact the hub 24 surface.

Figure 8:
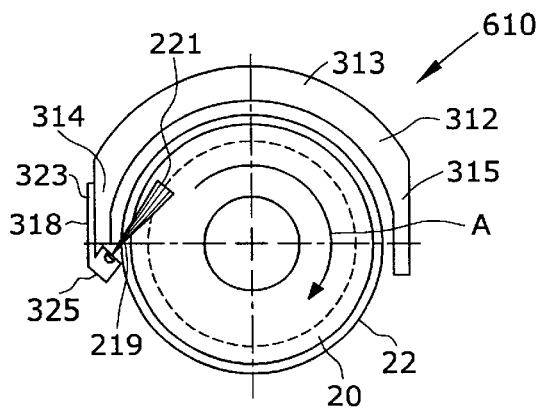

Another embodiment is illustrated in FIG. 8. In this embodiment a gang blade assembly 610 differs from the gang blade assembly 410 (FIG. 5) in that it includes a bracket 318 has a leg 323 which is longer than the leg of the bracket 218. The added length of the leg 323 allows a brush holder 325 to be rotated in such a way to allow the brush 219 to extend inside of the cover 312 to tangentially contact the hub 24 surface.

Figure 9:
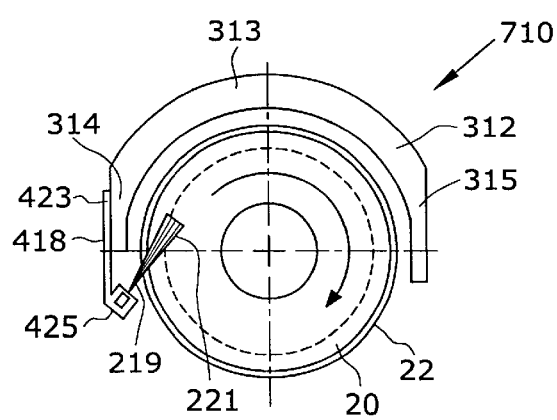

FIG. 9 illustrates another embodiment in which a gang blade assembly 710 includes a cover 312 having a trailing side 314 upon which a bracket 418 is mounted. The bracket 418 differs from the bracket 318 in that a leg 423 is longer than the leg 323. The longer leg 423 allows a brush holder 425 to be further rotated to allow the bristles 221 of the brush 219 to tangentially contact the hub 24 surface. Further, the leg 423 serves to suppress thrown detritus much like the deflector 216 (FIGS. 3a–4b).

Figure 10:
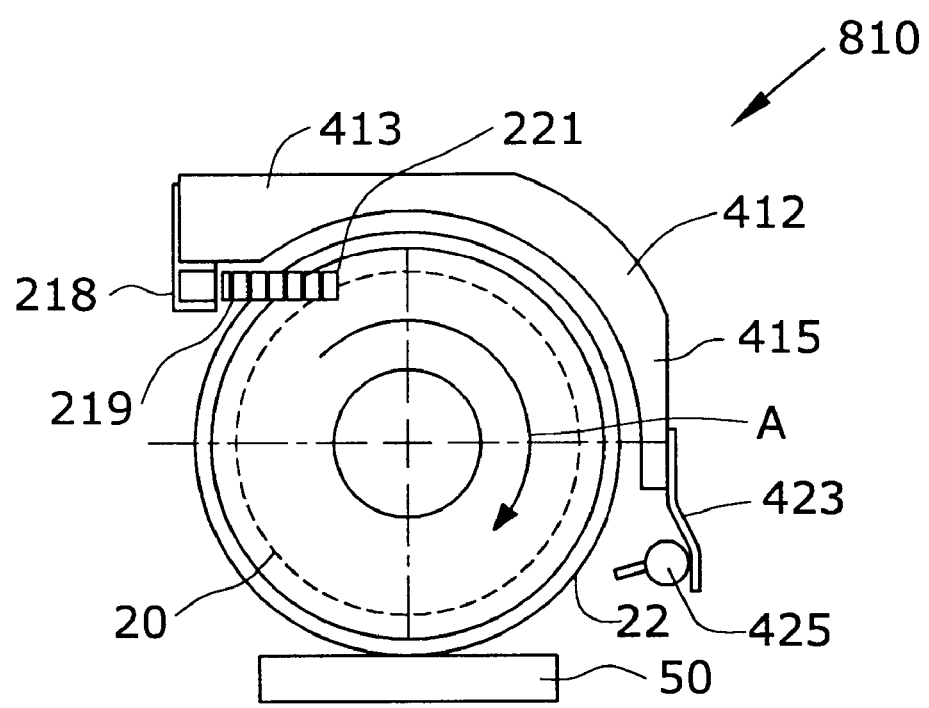
FIG. 10 is a side view of a gang blade assembly constructed in accordance with a third embodiment of the invention.

Illustrated in FIG. 10 is another embodiment of a gang blade assembly 810, which includes a cover 412. The cover includes a top side 413 and a leading side 415. The bracket 218 is mounted on the top side 413, with the brush 219 extending from the bracket 218 as described above. A water nozzle 425 is located adjacent to the leading side 415, and is directed toward the blades 22. The water nozzle 425 may be utilized in the previously described and illustrated gang blade assemblies. To suppress detritus from getting caught between the blades 22 and the water nozzle 425, a shield 423 is mounted to extend from an end of the leading side 415.

While the invention has been described in detail in connection with exemplary embodiments known at the time, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. For example, although some of the illustrated gang blade assemblies (FIGS. 3a–6, 8 and 9) show a single brush 219, it should be appreciated that more than one brush may be used. Also, it should be appreciated that a deflector may be used with embodiments that include a trailing side. In addition, although the blades 22 are shown to rotate in a direction A, obviously the blades 22 may rotate in an opposite direction. Further, while gang blade assemblies have been described and illustrated, a single blade on a hub may be used. Accordingly, the invention is not to be seen as limited by the foregoing description, but is only limited by the scope of the appended claims.

What is claimed as new and desired to be protected by Letters Patent of the United States is:

1. A cover assembly for use with a gang blade assembly, comprising:
    a cover having a leading side and a top side;
    at least one bracket mounted on said cover;
    at least one brush mounted on said at least one bracket, wherein said at least one brush comprises bristles which extend under said top side toward said leading side; and
    a deflector mounted on said at least one bracket.

2. The cover assembly of claim 1, wherein said deflector extends above said cover.

3. The cover assembly of claim 1, wherein said deflector extends below said cover.

4. The cover assembly of claim 1, wherein said cover includes a trailing side, said at least one bracket being mounted on said trailing side.

5. The cover assembly of claim 4, comprising first and second brackets, said first bracket being mounted on said trailing side and said second bracket being mounted on said leading side.

6. The cover assembly of claim 5, comprising first and second brushes, said first brush being mounted on said first bracket and said second brush being mounted on said second bracket.

7. The cover assembly of claim 1, wherein said top side is arched.

8. The cover assembly of claim 1, comprising a water nozzle directed under said cover.

9. The blade assembly of claim 8, comprising a shield mounted on said leading side of said cover.

* * * * *